US010073806B2

(12) United States Patent
Zhu et al.

(10) Patent No.: US 10,073,806 B2
(45) Date of Patent: Sep. 11, 2018

(54) APPARATUS AND METHODS FOR PROVIDING A RECONFIGURABLE BIDIRECTIONAL FRONT-END INTERFACE (71) Applicant: QUALCOMM Incorporated, San Diego, CA (US)

(72) Inventors: Zhi Zhu, San Diego, CA (US); Xiaohua Kong, San Diego, CA (US); Nir Gerber, Haifa (IL); Christian Josef Wiesner, Uxbridge Ontario (CA)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 14/856,978

(22) Filed: Sep. 17, 2015

(65) Prior Publication Data
US 2016/0335221 A1  Nov. 17, 2016

Related U.S. Application Data (60) Provisional application No. 62/161,080, filed on May 13, 2015.

(51) Int. Cl.
*G06F 13/42* (2006.01)
*G06F 13/36* (2006.01)
(Continued)

(52) U.S. Cl.
CPC .......... *G06F 13/4282* (2013.01); *G06F 13/36* (2013.01); *G06F 13/387* (2013.01);
(Continued)

(58) Field of Classification Search
CPC .. G06F 13/4282; G06F 13/36; G06F 13/4068; G06F 13/4086; G06F 13/4072; G06F 13/4022; G06F 13/387
See application file for complete search history.

(56) References Cited

U.S. PATENT DOCUMENTS 5,736,421 A * 4/1998 Shimomura .......... H01L 21/768
257/E21.575
6,177,835 B1 * 1/2001 Grebowsky ......... H04L 27/2332
329/304
(Continued)

FOREIGN PATENT DOCUMENTS

EP        0942562 A2    9/1999
JP     2009302822 A   12/2009
(Continued)

OTHER PUBLICATIONS

International Search Report and Written Opinion—PCT/US2016/022341—ISA/EPO—dated Oct. 10, 2016.
(Continued)

*Primary Examiner* — Idriss N Alrobaye
*Assistant Examiner* — Ronald T Modo
(74) *Attorney, Agent, or Firm* — Haynes and Boone, LLP (57) ABSTRACT An apparatus and methods are disclosed for a bidirectional front-end circuit included within a system on chip (SoC). The bidirectional front-end circuit includes a differential bidirectional terminal for receiving and transmitting signals. The bidirectional front-end circuit is configured to provide a first communication path between a first controller and a connector through the differential bidirectional terminal when operating in a first mode. And, the bidirectional front-end circuit is reconfigured to provide a second communication path between a second controller and the connector through the differential bidirectional terminal when operating in a second mode.

7 Claims, 4 Drawing Sheets (51) Int. Cl.
*G06F 13/40* (2006.01)
*G06F 13/38* (2006.01)

(52) U.S. Cl.
CPC ...... *G06F 13/4022* (2013.01); *G06F 13/4068* (2013.01); *G06F 13/4072* (2013.01); *G06F 13/4086* (2013.01)

(56) References Cited

U.S. PATENT DOCUMENTS

| | | | |
|---|---|---|---|
| 6,214,653 B1* | 4/2001 | Chen | H01L 21/76264 257/E21.133 |
| 7,068,065 B1 | 6/2006 | Nasrullah | |
| 8,626,975 B1 | 1/2014 | Sala | |
| 8,799,537 B1 | 8/2014 | Zhu et al. | |
| 2007/0064778 A1 | 3/2007 | Lacy et al. | |
| 2010/0150213 A1* | 6/2010 | Huang | H04L 25/0276 375/219 |
| 2010/0321129 A1* | 12/2010 | Onody | H01P 1/213 333/124 |
| 2013/0080665 A1 | 3/2013 | Park et al. | |
| 2013/0162318 A1* | 6/2013 | Kameda | H03F 3/45183 327/333 |
| 2013/0179603 A1 | 7/2013 | Tu et al. | |
| 2013/0217274 A1 | 8/2013 | Bar-Niv et al. | |
| 2013/0275629 A1 | 10/2013 | Hall | |
| 2016/0147704 A1* | 5/2016 | Guillerm | G06F 13/4068 710/106 |
| 2016/0173055 A1 | 6/2016 | Leddige et al. | |

FOREIGN PATENT DOCUMENTS

| | | |
|---|---|---|
| WO | WO-2009118582 A1 | 10/2009 |
| WO | WO-2010045363 A2 | 4/2010 |
| WO | WO-2011038211 A1 | 3/2011 |

OTHER PUBLICATIONS

Second Written Opinion from International Application No. PCT/US2016/022341, dated Jun. 21, 2017, 10 pages.
"Host-Side USB Type-C Port Configuration Switch for USB/Display Port Alt Mode, with Integrated Redriver," Parade, Retrieved date on Jun. 24, 2015, Retrieved from the Internet < URL: http://www.paradetech.com/products/usb-type-c-connectivity/ps8740/ >, 2 Pages.
"VESA Display Port ALT Mode for USB Type-C Standard," Sep. 22, 2014, Slide 1 to Slide 17.
ProQuest, "Report Information from ProQuest," Jun. 23, 2015, 4 pages.
Partial International Search Report—PCT/US2016/022341—ISA/EPO—dated Jun. 22, 2016.
Anonymous: "Universal Serial Bus—From Wikipedia, the free encyclopedia," Retrieved on Jun. 8, 2017, May 12, 2015, XP055379555, pp. 1-12. URL: https://de.wikipedia.org/w/index.php?title=Universai_Seriai_Bus&oldid=142004772.
Gunsch M., "USB Type C: "Alternate Mode" Mit Voller DisplayPort-Unterstützung—ComputerBase," Sep. 22, 2014, XP055379564, pp. 1-3. Retrieved from the Internet: URL:https://www.computerbase.de/2014-09/usb-typ-cdisplayport-alternate-mode/ [retrieved on Jun. 8, 2017].

* cited by examiner

APPARATUS AND METHODS FOR PROVIDING A RECONFIGURABLE BIDIRECTIONAL FRONT-END INTERFACE

CROSS REFERENCE TO RELATED APPLICATIONS

The present application claims priority to and the benefit of the U.S. Provisional Patent Application No. 62/161,080, filed May 13, 2015, which is hereby incorporated by reference in its entirety.

TECHNICAL FIELD

This application relates to computing device connectors and, more specifically, to a reconfigurable bidirectional front-end interface suitable for transmitting and receiving signals.

BACKGROUND

Computing devices may be equipped with one or more connectors that may provide connection, communication, and a power supply to a device. Such computing devices may use the connectors for various communications, including transferring and/or receiving signals. Examples of such computing devices may include, among others, personal computers, tablet computers, and smartphones.

A connector may receive and transmit various types of signals complying with different standards, including, for example, Universal Serial Bus (USB) for data, Display Port (DP) for video, PCIe, and Audio Interface, among others.

BRIEF DESCRIPTION OF THE DRAWINGS

The accompanying drawings, which form a part of the specification, illustrate exemplary embodiments and together with the description, further serve to explain the principles of these exemplary embodiments. In the drawings, like reference numbers may indicate identical or functionally similar elements. The drawing in which an element first appears is generally indicated by the left-most digit in the corresponding reference number.

DETAILED DESCRIPTION

The following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Examples of devices that can benefit from one or more embodiments of the present application are input output devices, such as connectors. The following disclosure will continue with a USB 3.1 Type-C connector example to illustrate various embodiments of the present application. It is understood, however, that the application should not be limited to a particular type of input/output connector, except as specifically claimed.

Disclosed herein are embodiments of an apparatus and methods for a reconfigurable bidirectional front-end interface suitable for transmitting and receiving signals. One example system embodiment includes a USB Controller and a Video Controller coupled to a reconfigurable USB SuperSpeed physical layer (USB-SS PHY) packaged as a system on chip (SoC), the outputs of which are coupled to a USB Type-C connector. In one embodiment, the USB-SS PHY includes a double lane USB-SS PHY (totaling four differential pair of lines) operable to be reconfigured dynamically as Display Port Alternative Mode lanes. When configured for USB 3.1 signals, the USB Controller utilizes two differential lines of the double lane USB-SS PHY for transmitting and two differential lines for receiving. Reconfiguring the physical layer for transmitting video signals in Display Port mode, allows the Video Controller to utilize up to four differential lines for transmitting and four differential lines for receiving. As such, and of note, is that four lines of the double lane USB-SS PHY are bidirectional and are operable to both transmit and receive signals, as compared to USB 3.1, where two unidirectional lines are dedicated for receiving signals and two unidirectional lines are dedicated for transmitting signals.

It is noted that other modes may be operable at the same time. For example, USB2 mode may be operable during Display Port mode, allowing for the double lane USB-SS PHY to transmit/receive different types of signals. Also, it is noted that the double lane USB-SS PHY may be configured to support both USB 3.1 mode and Display Port mode substantially simultaneously, for example, by using one or more phase-locked loops (PLLs) to support different frequency of each mode. As such, the scope of embodiments is not limited to any particular number of bidirectional lines and/or modes and any appropriate number of bidirectional lines and/or modes may be operable at the same or different times, in various embodiments.

In one embodiment, to achieve the dynamic reconfiguring of the double lane USB-SS PHY, transmit/receive terminals of a data line are coupled to USB 3.1 signals from a USB Controller and Display Port signals from a Video Controller. These transmit/receive terminals are also coupled to a shared terminating circuit for matching the characteristic impedance between the data lines when transmitting or receiving signals. Various embodiments described herein in more detail provide for using transistors to couple/decouple the Display Port signal paths and transistors to couple/decouple the shared terminating circuit to the transmit/receive terminals of the data line in order to allow reconfiguring of the terminals.

Figure 1A:
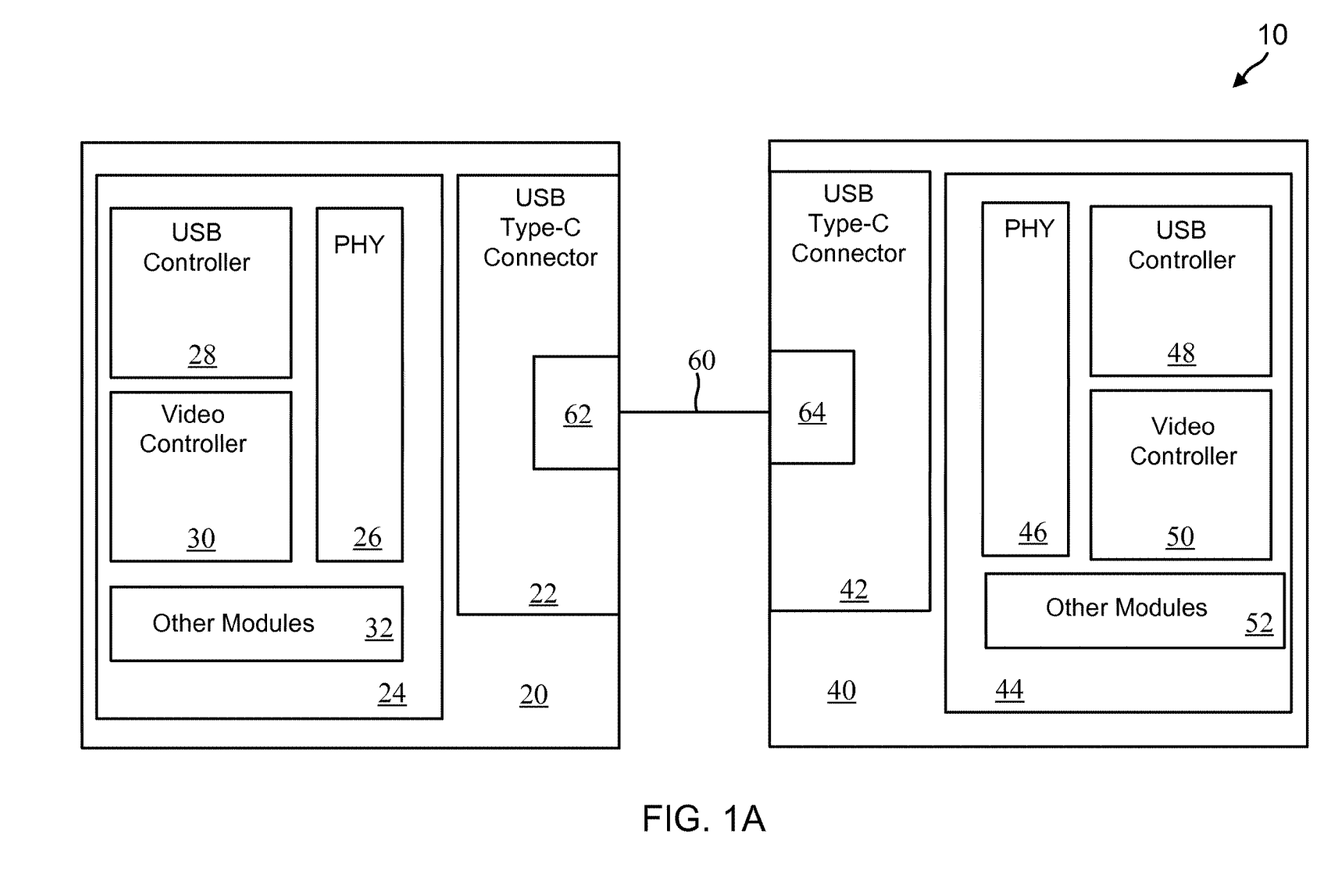
FIG. 1A is a block diagram illustrating an exemplary system, according to various embodiments.
Figure 1B:
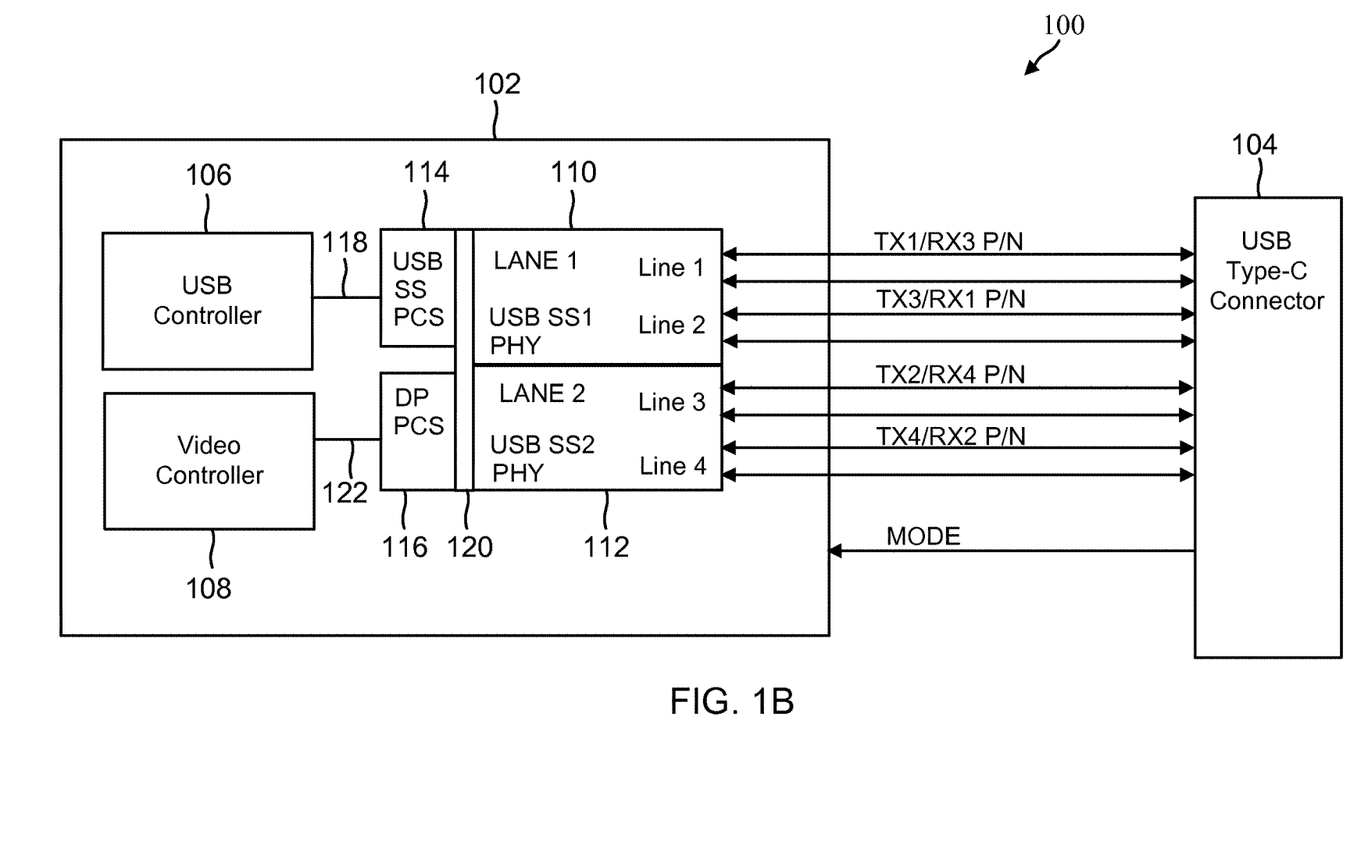
FIG. 1B is a block diagram illustrating an exemplary system, according to various embodiments.

FIG. 1A is a block diagram illustrating an example system 10, in accordance with various embodiments of the present disclosure. In FIG. 1A, system 10 includes devices 20, 40, which are configured to communicate with each other. A cable 60, having plugs 62, 64, on both ends for mating with USB Type-C Connectors 22, 42 provides the communication path for Devices 20, 40. Device 20 includes a SoC 24 including a USB SuperSpeed physical layer (PHY) 26, a USB Controller 28, a Video Controller 30, and one or more other modules 32, coupled together and configured for receiving and transmitting signals to and from the USB Type-C Connector 22. Device 40 includes a SoC 44 including a PHY 46, a USB Controller 48, a Video Controller 50, and one or more other modules 52, coupled together and configured for receiving and transmitting signals to and from the USB Type-C connector 42. Devices 20 and 40 may include personal computers, tablet computers, smartphones, smart televisions, and gaming consoles, among others. FIG. 1B is a block diagram illustrating an example system 100, which corresponds with any one of device 20, 40 of FIG. 1A, in accordance with various embodiments of the present disclosure. In the present embodiment, the system 100 allows for transmitting and receiving different types of signals. In the present embodiment, the different types of signals are USB 3.1 and Display Port signals. Although the system of FIG. 1B provides a USB 3.1/DataPort Type-C connector that transmits/receives USB 3.1 and Display Port signals example, to illustrate various principles, it is understood that the disclosure is not limited to USB 3.1/DataPort Type-C connector or to USB 3.1 and Display Port signals.

System 100 allows for dynamic reconfiguring at the physical layer, when operating in USB 3.1 mode and Display Port mode. The system 100 includes a SoC 102 coupled to a USB Type-C Connector 104. The system 100 may be implemented on a single board that includes both the SoC 102 and the USB Type-C Connector 104. The SoC 102 includes a USB Controller 106, a Video Controller 108, and a reconfigurable first 110 and second 112 USB SuperSpeed lane physical layer (USB SS1 PHY and USB SS2 PHY). Collectively, elements 110 and 112 may also be referred to herein as a double lane reconfigurable USB-SS PHY 110 and 112. The use of a double lane reconfigurable USB-SS PHY 110 and 112 is optional, and in other embodiments, only a single reconfigurable USB-SS PHY is utilized, the output of which is multiplexed off the SoC 102 into redundant signals before reaching the USB Type-C Connector 104.

A USB SuperSpeed Physical Coding Sublayer (USB SS PCS) 114 is coupled to and between the USB Controller 106 and the double lane reconfigurable USB-SS PHY 110 and 112 by connections 118 and 120. The USB SS PCS 114 includes digital control logic for receiving the USB Controller 106 signals, which may be transmitted via connection 118 in parallel as bits of data. The USB SS PCS 114 is operable to decode the signals from the USB Controller 106, and convert them into suitable analog signals for utilization by the analog circuits of the double lane reconfigurable USB-SS PHY 110 and 112.

Similarly, a Display Port power controls state (DP PCS) 116 is coupled to and between the Video Controller 108 and the double lane reconfigurable USB-SS PHY 110 and 112 by connections 122 and 120. The DP PCS 116 includes digital control logic for receiving the Video Controller 108 signals, which may be transmitted via connection 122 in parallel as bits of data. The DP PCS 116 is operable to decode the signals and convert them into suitable analog signals for utilization by the analog circuits of the double lane reconfigurable USB-SS PHY 110 and 112. In the present embodiment, connection 120 provides a multiplexing function, at the physical layer, on the analog signals received from the USB SS PCS 14 and DP PCS 116, thereby reducing device cost and improving performance since the multiplexing is performed on the lower rate parallel signals (as compared to higher speed multiplexing on serial signals). The SoC 102 may also include other modules, for example, one or more processing cores, a modem, other circuits, and logic. The scope of embodiments is not limited to SoCs circuits unless specifically claimed.

In one embodiment, the first and second reconfigurable USB-SS PHY 110, 112 are coupled to four differential data lines including: Line 1 TX1/RX3 P/N, Line 2 TX3/RX1 P/N, Line 3 TX2/RX4 P/N, and Line 4 TX4/RX2 P/N. Notably, the data Lines 1 to 4 are reconfigurable and bidirectional and can be utilized for both receiving and transmitting differential signals. Differential signals are used for differential encoding where the same electrical signal, of opposite polarity, is transmitted over the pair of data lines. The receiving circuit evaluates the difference between the two signals to determine the final value.

The four pair of data lines for coupling the double lane reconfigurable USB-SS PHY 110 and 112 to the USB Type-C Connector 104 may be twisted pair, traces on a printed circuit board and/or chip, conductors in a coaxial cable, ribbon cable, or any other suitable cable, or any other suitable means based on design requirements.

Different types of signals complying with different standards may be transmitted from the double lane reconfigurable USB-SS PHY 110 and 112 to the USB Type-C Connector 104 at the same time or at different times. For example, transmitted signals may comply with, for example, USB 3.1, Display Port, High-Definition Multimedia Interface (HDMI), and other standards. Also, other signals, including power/ground voltages may be provided over other lines of the USB Type-C Connector 104. In one embodiment, depending on the type of device connected to the USB Type-C Connector 104, a MODE signal may be transmitted from the USB-Type-C connector 104 back to the USB-SS PHY 110 and 112 and/or to a controller on the SoC 102 to indicate in which mode, corresponding to one or more standards, to operate. The following disclosure will continue with a USB 3.1 mode and a Display Port mode example to illustrate various embodiments of the present application. It is understood, however, that the application should not be limited to a particular type of mode, except as specifically claimed.

When the MODE signal indicates USB 3.1 mode, the four differential pair lines of the double lane USB-SS 110 and 112 are set to operate in USB 3.1 mode. In this mode, Line 1 operates as a transmission line (TX1 P/N), Line 2 operates as a reception line (RX1 P/N), Line 3 operates as a transmission line (TX2 P/N), and Line 4 operate as a reception line (RX2 P/N). As such, in USB 3.1 mode, two lines of the double lane USB-SS PHY 110 and 112 may be operable to transmit video signals from the USB Controller 106 to the USB Type-C Connector 104 and two lines may be operable to receive signals. However, since the USB Type-C Connector 104 can receive a plug in either orientation (i.e., a plug can rotate 180 degrees), although all four lines may be active only two will be utilized in this example. As such, based on plug orientation, only one of the double lane USB-SS 110 and 112 is operable to transmit and receive signals, and the other is idle. For example, based on plug orientation, the first reconfigurable USB-SS 112 may be idle and USB-SS 110 may be operable with Line 1 used for transmitting signals and Line 2 used for receiving signals. Alternatively, based on plug orientation the first reconfigurable USB-SS 110 may be idle and USB-SS 112 may be operable with Line 3 used for transmitting data and Line 4 used for receiving signals. The double lane USB-SS 110 and 112 may be operable to be reconfigured to accommodate an improperly manufactured cable that has lines switched. For example, when the cable has Line 1 switched with Line 2, Line 1 operates as TX3/RX1 P/N and Line 2 operates as TX1/RX3 P/N.

When the MODE signal indicates Display Port mode, the four lines of the double lane USB-SS 110 and 112 are set to operate in Display Port mode. In one embodiment, when in Display Port mode the lines are set to transmit video signals such that Line 1 operates as a transmission line (TX1 P/N), Line 2 is reconfigured and operates as a transmission line (TX3 P/N), Line 3 operates as a transmission line (TX2 P/N), and Line 4 is reconfigured and operates as a transmission line (TX4 P/N). As such, in Display Port mode, all of the lines of the double lane USB-SS PHY 110 and 112 may be active to transmit video signals from the Video Controller 108 to the USB Type-C Connector 104. The USB Type-C Connector 104 and plug orientation may be correctly aligned, allowing for transmitting up to four signals (one signal per line) from Video Controller 108. As such, in one embodiment while in Display Port mode, the four lines of the double lane USB-SS 110 and 112 may be active and each line transmitting one signal from the Video Controller 108.

In alternative embodiments, when in Display Port mode, the lines operate as reception lines allowing for the Video Controller 108 to receive signals from external devices connected to the USB Type-C Connector 104. In such embodiments, Line 1 is reconfigured and operates as a reception line (RX3 P/N), Line 2 operates as a reception line (RX1 P/N), Line 3 reconfigured and operates as a reception line (RX4 P/N), and Line 4 operates as a reception line (RX2 P/N). As such, in Display Port mode, all of the lines of the double lane USB-SS PHY 110 and 112 may be active to receive video signals from a device coupled to the USB Type-C Connector 104 through a plug. The USB Type-C Connector 104 and plug orientation may be correctly aligned, allowing for receiving up to four signals (one signal per line) from a video controller of the plugged in device. As such, in one embodiment while in Display Port mode, the four lines of the double lane USB-SS 110 and 112 may be active and each line receiving one signal from an external device, which is received by the Video Controller 108.

Figure 2:
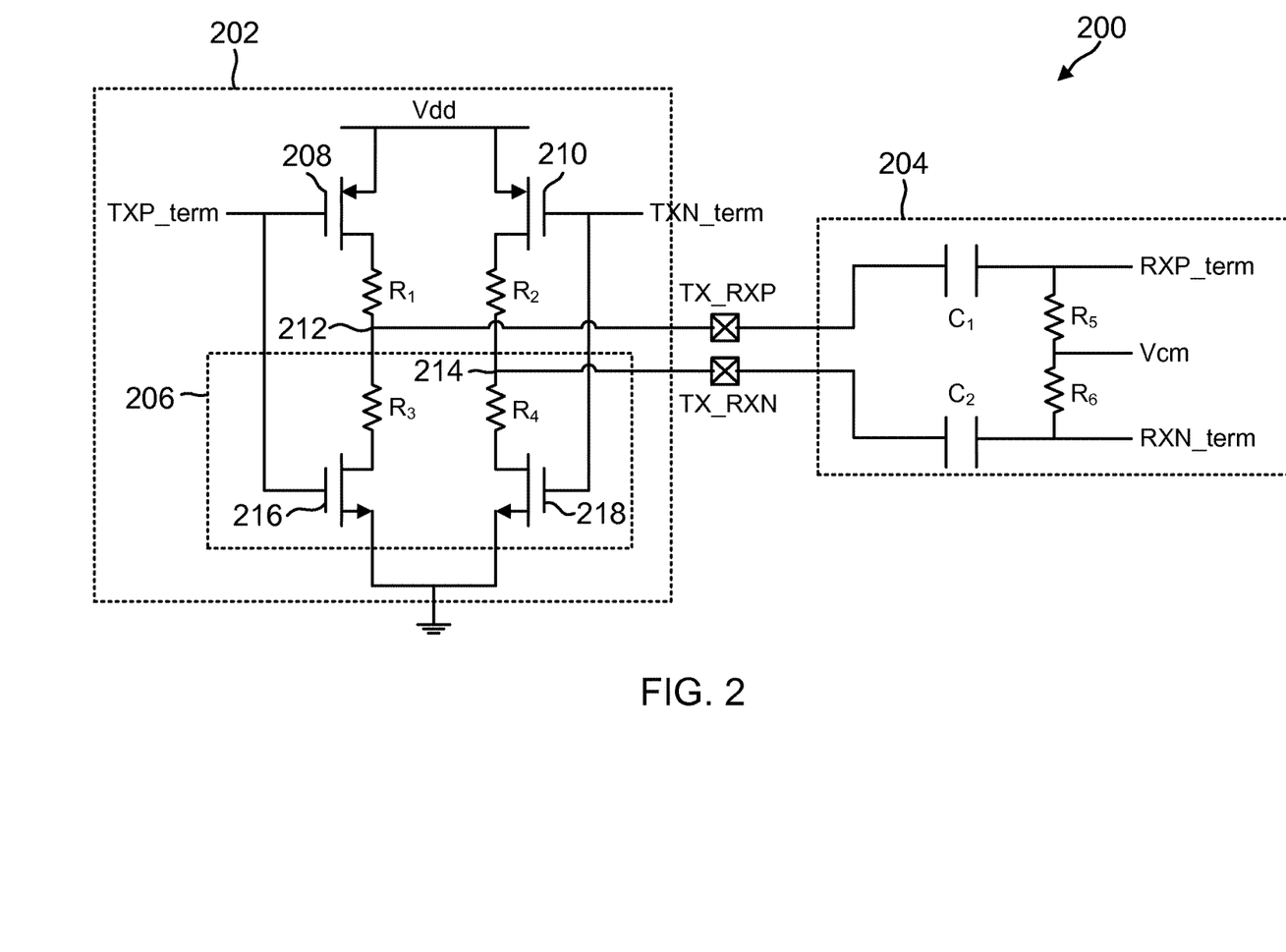
FIG. 2 is an exemplary bidirectional lane front-end circuit that may be used in the system of FIGS. 1A and 1B, according to various embodiments.

FIG. 2 shows an exemplary implementation of a bidirectional lane front-end circuit 200 according to an embodiment of the present disclosure. The bidirectional lane front-end circuit 200 is useful for providing dynamic reconfiguration for different modes at the physical layer. The bidirectional lane front-end circuit 200 may be implemented as part of the first reconfigurable USB-SS PHY 110 and/or the second reconfigurable USB-SS PHY 112, within the SoC 102 of the embodiment of FIGS. 1A and 1B. The bidirectional lane front-end circuit 200 is referred to as bidirectional because the front terminals, i.e., TX_RXP and TX_RXN, can both transmit and receive signals.

The bidirectional lane front-end circuit 200 includes a voltage mode transmitter (TX) circuit 202, a receiver (RX) circuit 204, and a shared terminating impedance circuit 206 included as part of the voltage mode TX circuit 202. In the illustrated embodiment, the voltage mode TX circuit 202 has two parallel inverters. The voltage mode TX circuit 202 includes an input voltage source Vdd, a first input p-channel metal oxide semiconductor (PMOS) transistor 208, a second input PMOS transistor 210, and a first and second resistor $R_1$ and $R_2$.

The source of the PMOS transistors 208 and 210 are coupled to Vdd. The gate input of the PMOS transistor 208 is coupled to the TXP_term, the drain of the PMOS transistor 208 is coupled to a first resistor $R_1$, and the other side of the first resistor $R_1$ is coupled to the TX_RXP bidirectional terminal through data line 212. Similarly, the gate input of the PMOS transistor 210 is coupled to the TXN_term, the drain of the PMOS transistor 210 is coupled to a second resistor $R_2$, and the other side of the second resistor $R_2$ is coupled to the TX_RXN bidirectional terminal through data line 214. The TXP_term and the TXN_term that receive the P and N input signals are unidirectional terminals.

Each of the first and second resistors $R_{1,2}$ may be implemented with one or more resistors (in series or parallel) and may be selected to accommodate different types of transmission and/or reception signals based on protocol utilized and desired impedance. The PMOS transistors 208 and 210 act as switches that couple the Display Port signals from the Video Controller 108 received through the P and N input signals to the TX_RXP and TX_RXN bidirectional terminals, and also isolate (or decouple) the transmitting voltage when Display Port mode is not active.

As noted above, the shared terminating impedance circuit 206 is part of the voltage mode TX circuit 202. The shared terminating impedance circuit 206 includes a third resistor $R_3$ coupled to the TX_RXP terminal through data line 212 and a fourth resistor $R_4$ coupled to the TX_RXN terminal through data line 214. An n-channel metal oxide semiconductor (NMOS) transistor 216 is coupled to the other terminal of the third resistor $R_3$ and a second NMOS transistor 218 is coupled to the other terminal of the fourth resistor $R_4$. The NMOS transistors 216 and 218 act as switches allowing for biasing the voltage output when transmitting in Display Port mode and for impedance matching between the data lines 212 and 214 and the Type-C Connector 104 when receiving in USB 3.1 mode. The gate input to the NMOS transistor 216 is common with the gate input to the PMOS transistor 208 and receives a P input signal through the TXP_term, and the gate input to the NMOS transistor 218 is common with the gate input to the PMOS transistor 210 and receives the N input signal through the TXN_term. The P and N input signals are used to control the mode of operation of the circuit, and when in Display Port mode provide video signals by outputting the P and N signal to the bidirectional TX_RXP and TX_RXN terminals, as discussed below in connection with Table 1.

Each of the third and fourth resistors $R_{3,4}$ may include one or more resistors (in series or parallel) and a plurality of impedance switches (not shown). In such embodiments, each of the plurality of impedance switches controls whether one (or more) of the resistors is switched into a resistor network thereby setting the impedance of that terminating resistor. The impedance of the shared terminating impedance circuit 206 is referred to as "shared terminating impedance" because the impedance is utilized when transmitting and receiving signals and the data lines to which they are coupled terminate at the Type-C Connector.

When transmitting signals in Display Port mode, the third and fourth resistors $R_{3,4}$ are used to bias the output voltage and to provide a DC current path to ground. When receiving signals in USB 3.1 mode, the third and fourth resistors $R_{3,4}$ are used to provide terminating impedance matching. The impedance of the third and fourth resistors $R_{3,4}$ may be selected to accommodate different types of transmission lines (e.g., twisted pair, traces on a printed circuit board and/or chip, conductors in a coaxial cable, ribbon cable, or any other suitable cable) that extend from the TX_RXP and TX_RXN terminals to the USB Type-C Connector 104. Also, the impedance of the third and fourth resistors $R_{3,4}$ may be selected to accommodate different types of transmission and/or reception signals based on protocol utilized. In the present embodiment, each of the third and fourth resistors $R_{3,4}$ are single resistors having a value of about 50 ohms and the transmission line extending from the TX_RXP and TX_RXN terminals to the USB Type-C Connector 104 has an impedance of about 50 ohms.

The RX circuit 204 includes a first capacitor $C_1$ coupled to the TX_RXP terminal and a second capacitor $C_2$ coupled to the TX_RXN terminal. The RX circuit 204 further includes fifth and sixth resistors $R_{5,6}$ coupled to the other terminals of the two capacitors $C_{1,2}$, respectively, and a common-mode voltage VCM coupled between the fifth and sixth resistors $R_{5,6}$. The split termination with the two capacitors $C_{1,2}$, is useful for providing filtering to eliminate common-mode noise that may be present between the complementary signals of the differential pair RXP_term and RXN_term. RXP_term and RXN_term are unidirectional terminals operable to receive signals.

The fifth and sixth resistors $R_{5,6}$ may be implemented with one or more resistors (in series or parallel) and each of the two capacitors $C_{1,2}$ may be implemented with one or more capacitors (in series or parallel). The impedance of the fifth and sixth resistors $R_{5,6}$ may be selected to allow for a pullup and pulldown combination for terminating different types of transmission lines (e.g., twisted pair, traces on a printed circuit board and/or chip, conductors in a coaxial cable, ribbon cable, or any other suitable cable) that extend from the TX_RXP and TX_RXN terminals to the USB Type-C Connector 104. Also, the values of the fifth and sixth resistors $R_{5,6}$ and the two capacitors $C_{1,2}$ may be selected to accommodate different types of transmission and/or reception signals based on protocol utilized.

Each of the first and second reconfigurable USB-SS PHY 110 and 112 (FIG. 1B) may include the bidirectional lane front-end circuit 200. In one embodiment, a first bidirectional lane front-end circuit 200 is implemented as part of the first reconfigurable USB-SS PHY 110 where the shared terminating impedance circuit 206 provides matching characteristic impedances of the two data lines of Line 1 (TX1/RX3 P/N) of the first reconfigurable USB-SS PHY 110. Further, a second bidirectional lane front-end circuit 200 is implemented as part of the first reconfigurable USB-SS PHY 110, where the shared terminating impedance circuit 206 provides matching characteristic impedances of the two data lines of Line 2 (TX3/RX1 P/N) of the first reconfigurable USB-SS PHY 110.

In another embodiment, a third bidirectional lane front-end circuit 200 is implemented as part of the second reconfigurable USB-SS PHY 112 and the shared terminating impedance circuit 206 provides matching characteristic impedances of the two data lines of Line 3 (TX2/RX4 P/N) of the second reconfigurable USB-SS PHY 112. Further, a fourth bidirectional lane front-end circuit 200 is implemented as part of the second reconfigurable USB-SS PHY 112 and the shared terminating impedance circuit 206 provides matching characteristic impedances of the two data lines of Line 4 (TX4/RX2 P/N) of the second reconfigurable USB-SS PHY 112. As already noted, the embodiments are not mutually exclusive and four bidirectional lane front-end circuits 200 may be included in the first and second reconfigurable USB-SS PHY 110 and 112.

During operation, to receive signals, the Vdd voltage of the voltage mode TX circuit 202 is decoupled from the TX_RXP and TX_RXN bidirectional terminals by applying a logic one to the gate input of the PMOS transistor 208 and a logical one to the gate input of the PMOS transistor 210 via the P and N input signals at TXP_term and TXN_term, respectively. Also, a logical one is applied to the gate input of the NMOS transistor 216 since the gate input of the NMOS transistor 216 is common with the gate input of the PMOS transistor 208, and a logical one is applied to the gate input of the NMOS transistor 218 since the gate input of the NMOS transistor 218 is common with the gate input of the PMOS transistor 210. The applied logical one at the gate input of the NMOS transistors 216 and 218 activates the shared terminating impedance circuit 206, providing a ground path. As a result, the shared terminating impedance circuit 206 is coupled to the TX_RXP and TX_RXN bidirectional terminals through the third and fourth resistors $R_{3,4}$ providing impedance matching when receiving signals. The input signals received through the TX_RXP and TX_RXN terminals are received at the differential pair RXP_term and RXN_term via the first and second capacitors $C_{1,2}$ and ultimately sent to the USB 3.1 controller 106 through the connection 120, USB SS PCS 114, and connection 118.

To transmit signals, the Vdd of the voltage mode TX circuit 202 is coupled to the TX_RXP terminal by applying a logic zero to the gate input of the PMOS transistor 208 via signal P at TXP_term. Since the gate input of the NMOS transistor 216 is common with the gate input of the PMOS transistor 208, a logical zero is also applied to the gate input of the NMOS transistor 216 thereby decoupling the TX_RXP terminal from ground.

Because the P and N signals are differential, substantially at the same time as applying a logic zero via signal P, a logic one is applied to the gate input of the PMOS transistor 210 via signal N at TXN_term. Applying the logic one via signal N decouples the Vdd voltage from the TX_RXN terminal and since the gate input of the NMOS transistor 218 is common with the gate input of the PMOS transistor 210, a logical one is applied to the gate input of the NMOS transistor 218 thereby coupling the TX_RXN terminal to ground through resistor $R_4$.

The Vdd of the voltage mode TX circuit 202 is coupled to the TX_RXN terminal by applying a logic zero to the gate input of the PMOS transistor 210 via signal N. Since the gate input of the NMOS transistor 218 is common with the gate input of the PMOS transistor 210, a logical zero is also applied to the gate input of the NMOS transistor 218 thereby decoupling the TX_RXP terminal from ground.

Because the P and N are a differential pair, substantially at the same time as applying a logic zero via signal N, a logic one is applied to the gate input of the PMOS transistor 208 via signal P. Applying the logic one via signal P decouples the Vdd from the TX_RXP terminal and since the gate input of the NMOS transistor 216 is common with the gate input of the PMOS transistor 208, a logical one is applied to the gate input of the NMOS transistor 216 thereby coupling the TX_RXP bidirectional terminal to ground through resistor $R_3$.

Table 1 provided below summarizes the values of the TX_RXP and TX_RXN terminals based on the signal P/N at TXP_term and TXN_term.

TABLE 1

| MODE | Signal P | Signal N | TX_RXP | TX_RXN |
|---|---|---|---|---|
| Receive | 1 | 1 | RXP | RXN |
| Transmit | 1 | 0 | TX (0) | TX (1) |
| Transmit | 0 | 1 | TX (1) | TX (0) |

Various embodiments may include advantages and disadvantages. In more detail, with reference to system 100 of FIG. 1B, by enabling dynamic reconfiguration of receiving lines into transmitting lines and transmitting lines into receiving lines within the PHY and sharing a termination circuit when transmitting and receiving, the embodiment of FIG. 1B allows for a smaller footprint/area on the SoC, allows for reusing four lines for transmitting and receiving, with the additional benefit of improving operational functionality (e.g., speed). Additional advantages of the embodiment of FIG. 1B include, not requiring a Crosspoint Switch, not requiring a multiplexer, not requiring a separate Video PHY, minimizing part cost, and simplifying manufacturing complexity. Further, the system disclosed herein is easily implemented into current devices. It is understood that different embodiments may have different advantages, and no particular advantage is necessarily required of any embodiment.

Figure 3:
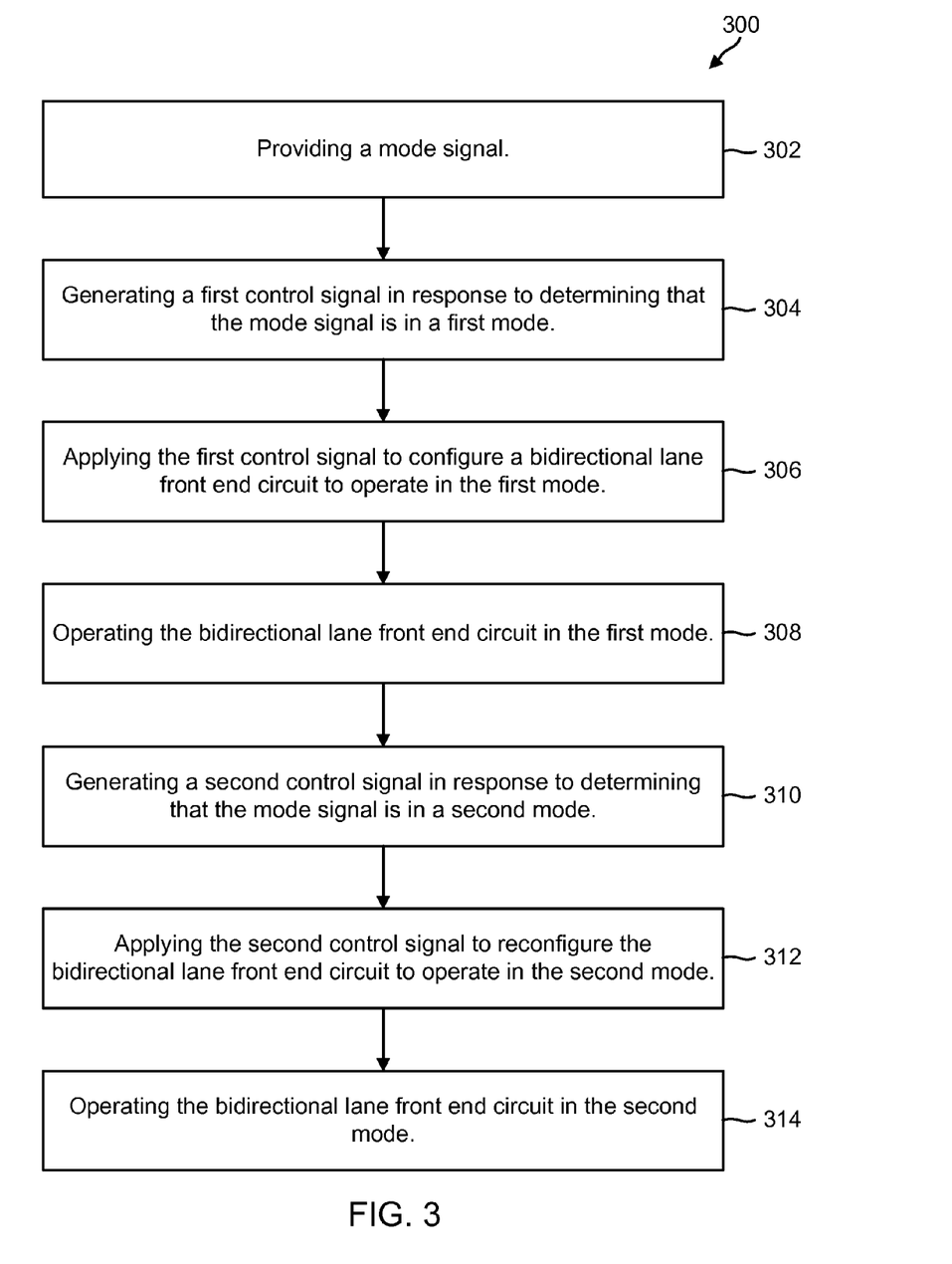
FIG. 3 is a simplified flowchart illustrating a method for providing different modes of operation at the physical layer of a connector, according to various embodiments.

FIG. 3 is an illustration of an example method 300, according to one embodiment, allows for dynamically reconfiguring data lines for transmitting and receiving different types of signals. In the present embodiment, the different types of signals are USB 3.1 and Display Port signals. Although in the present embodiment method 300 provides for reconfiguring only the transmit lines (i.e., Lines 2 and 4) during Display Port mode, to illustrate various principles, it is understood that the disclosure is not limited by this example and the present disclosure additionally provides for reconfiguring the receiving lines (i.e., Lines 1 and 3) during Display Port mode.

Method 300 may be performed by circuits, such as those shown in FIGS. 1A, 1B, and 2. Specifically, FIGS. 1A, 1B, and 2 show a system including a USB Type-C connector 104 that provides reception and/or transmission of different types of signals based on a mode of operation. Various embodiments include the actions of method 300 being performed by any of the circuits or combination of the circuits shown in FIGS. 1A, 1B, and 2 as appropriate.

At action 302, a MODE signal is provided. For instance, in the example of FIG. 1B, the MODE signal is provided by a first device plugged to the USB Type-C Connector 104. The MODE signal may be provided to one or more controllers, such as USB Controller 106 and/or Video Controller 108, or modules on a circuit board coupled to the USB Type-C Connector 104. The one or more controllers or modules may be within SoC 102 on the circuit board, such as that shown in FIG. 1B.

At action 304, a first control signal is generated in response to determining that the MODE signal is in a first mode. In the present embodiment, the first mode is USB 3.1 mode. Returning to the example of FIG. 1B, the first control signal is generated by the USB Controller 106 and/or Video Controller 108, or other control modules on the SoC 102.

At action 306, the first control signal is applied to terminals of a bidirectional lane front-end circuit to configure the bidirectional lane front-end circuit to operate in the first mode. For example, in the embodiment of FIG. 1B, the USB Controller 106 and/or Video Controller 108, or other control modules on the SoC 102 may apply the first control signal to terminals TXP_term and TXN_term, of the bidirectional lane front-end circuit 200 illustrated in FIG. 2. As noted above in connection with the embodiment of FIG. 2, the bidirectional lane front-end circuit 200 may be included in a Universal Serial Bus SuperSpeed physical layer 110, 112 (USB SS PHY) of FIG. 1B.

Referring back to FIG. 2, since in the present embodiment the first mode is USB 3.1 mode, configuring the bidirectional lane front-end circuit 200 includes configuring a bidirectional terminal of Line 2 and/or Line 4 of the USB SS PHY 110, 112 to receive signals. Configuring the bidirectional terminal to receive signals may include coupling a first terminal TX_RXP and a second terminal TX_RXN, of the bidirectional terminal to a terminating impedance circuit 206, as shown in FIG. 2. Coupling the first terminal TX_RXP and the second TX_RXN terminal to the terminating circuit 206 may include switching on two transistors of an inverter circuit, as shown in FIG. 2.

At action 308, the bidirectional lane front-end circuit operates in the first mode. In the example of FIG. 1B, since in the present embodiment the first mode is USB 3.1 mode, operating the bidirectional lane front-end circuit 200 in the first mode includes receiving a USB 3.1 signal over a bidirectional line, such as Lines 2 and 4, coupled to the bidirectional terminal of the USB SS PHY 110, 112. Further, in the present embodiment, operating the bidirectional lane front-end circuit in the first mode may include transmitting a first USB 3.1 signal received from USB Controller 106 over the USB SS PHY 110 and 112 to the USB Type-C Connector 104 over a unidirectional line, such as Lines 1 and 3, and transmitting a second USB 3.1 signal received from the USB Type-C Connector 104 over the USB SS PHY 110 and 112 to the USB Controller 106 over a bidirectional line, such as Lines 2 and 4. The first and second signals may be handled simultaneously by the USB SS PHY.

At action 310, a second control signal is generated in response to determining that the MODE signal is in a second mode, different than the first mode. For instance, in the example of FIG. 1, USB Controller 106 and/or Video Controller 108, or other modules, generate the second control signal. In the present embodiment, the second mode is Display Port mode.

At action 312, the second control signal is applied to terminals of the bidirectional lane front-end circuit to reconfigure the bidirectional lane front-end circuit to operate in the second mode. Referring back to the example of FIG. 2, since the second mode is Display Port mode, reconfiguring the bidirectional lane front-end circuit 200 to operate in the second mode includes reconfiguring the bidirectional terminal of the USB SS PHY to operate to transmit signals. For instance, configuring the bidirectional terminal of the USB SS PHY to operate to transmit signals includes coupling the first terminal TX_RXP of the bidirectional terminal to the terminating circuit 206 and coupling the second terminal TX_RXN of the bidirectional terminal to a voltage source Vdd. Coupling the first terminal TX_RXP to the terminating circuit 206 and coupling the second terminal TX_RXN to the voltage source Vdd includes switching on a first and a second transistor of an inverter circuit, such as that shown in FIG. 2.

At action 314, the bidirectional lane front-end circuit operates in the second mode. In the example of FIG. 1B, since in the present embodiment the second mode is Display Port mode, operating in the second mode includes transmitting to the USB Type-C Connector 104 a first signal over a unidirectional line, such as Lines 1 and 3, coupled to the USB SS PHY 110, 112, and transmitting to the USB Type-C Connector 104 a second signal over a reconfigured bidirectional line, such as Lines 2 and 4, coupled to the bidirectional terminal of the USB SS PHY 110, 112, or over the remaining unidirectional terminal. The first and second signals may be transmitted simultaneously over the selected lines. Consequently, the example allows for transmitting of four different signals over Lines 1-4 simultaneously. Operating the bidirectional lane front-end circuit 200 in the second mode includes transmitting Display Port signals received from Video Controller 108.

The scope of embodiments is not limited to the specific method shown in FIG. 3. Other embodiments may add, omit, rearrange, or modify one or more actions. For example, although the above embodiments of FIG. 3 provide an illustration where the first mode is USB 3.1 mode and the second mode is Display Port mode, these two modes may be swapped such that the Display Port mode is first and the USB 3.1 port mode is second. Also, it is understood that the above disclosure is not limited to USB 3.1 and Display Port modes and any different modes corresponding with two different protocols are contemplated and within the scope of this disclosure. Also, as noted above, although method 300 of FIG. 3 provides for reconfiguring two transmit lines during Display Port mode, it is understood that the present disclosure additionally provides for reconfiguring two receiving lines during Display Port mode, such that in Display Port mode all four lines can be configured to both transmit and receive video signals.

As those of ordinary skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A circuit comprising: a system on chip (SoC) including a bidirectional lane front-end circuit, which includes a differential bidirectional terminal selectively configurable for receiving signals in a first mode and transmitting signals in a second mode; and an impedance matching circuit configured to both: 1) provide a ground path for receiving signals in the first mode and 2) transmit signals in the second mode through the differential bidirectional terminal, wherein the impedance matching circuit comprises a first transistor and a second transistor, wherein a source or drain of the first transistor is coupled to the differential bidirectional terminal through a first resistor, wherein a source or drain of the second transistor is coupled to the differential bidirectional terminal through a second resistor, and wherein the first transistor and the second transistor couple the differential bidirectional terminal to ground.

2. The circuit of claim 1, wherein, when operating in the first mode corresponding to a first protocol, the bidirectional lane front-end circuit is configured to provide a first communication path between a first controller and an external connector through the differential bidirectional terminal.

3. The circuit of claim 2, wherein, when operating in the second mode corresponding to a second protocol, the bidirectional lane front-end circuit is reconfigured to provide a second communication path between a second controller and the external connector through the differential bidirectional terminal.

4. The circuit of claim 3, wherein the first protocol is a Universal Serial Bus (USB) 3.1 protocol, the second protocol is a Display Port (DP) protocol, the first controller is a USB controller, the second controller is a video controller, and the external connector is a USB Type-C connector external to the SoC, for communication with an external device.

5. The circuit of claim 4, wherein, when operating in the USB 3.1 protocol, the bidirectional lane front-end circuit is operable to receive signals from the external device coupled to the USB Type-C connector through the differential bidirectional terminal and provide the received signals to the USB controller, and wherein, when operating in the DP protocol, the bidirectional lane front-end circuit is operable to transmit signals from the video controller to the external device coupled to the USB Type-C connector through the differential bidirectional terminal.

6. The circuit of claim 1, wherein the bidirectional lane front-end circuit includes a transmitting circuit having the first transistor and a third transistor, wherein a drain of the first transistor is coupled to the differential bidirectional terminal, wherein a drain of the third transistor is coupled to the differential bidirectional terminal, and wherein a gate of the first transistor and a gate of the third transistor are coupled to a common terminal.

7. The circuit of claim 6, wherein the third transistor is a p-channel metal oxide semiconductor (PMOS) transistor, and wherein the first transistor is a n-channel metal oxide semiconductor (NMOS) transistor.

* * * * *